3,028,377
TRIS-AZIRIDINYL PHOSPHAZO SULFONE COMPOUNDS AND THE PREPARATION THEREOF
Paul Resnick, Brooklyn, and John J. R. Luzzi, Freeport, N.Y., assignors to Interchemical Corporation, New York, N.Y., a corporation of Ohio
No Drawing. Filed Feb. 15, 1960, Ser. No. 8,528
6 Claims. (Cl. 260—239)

The invention relates to new and useful chemical compounds and to the preparation thereof.

The new compounds can be represented by the formula

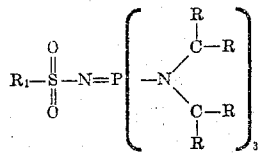

where R is hydrogen or lower alkyl radical containing up to 2 carbon atoms and $R_1$ is aryl, or alkyl, or aralkyl. They are obtained by reacting one molecular amount of a phosphazo sulfone compound of formula

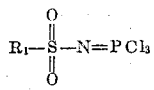

where $R_1$ is represented by the same groups as described above with three molecular amounts of an aziridinyl compound of formula

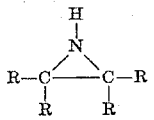

where R is represented by the same groups as described above.

The phosphazo sulfone compound can be obtained by reacting the corresponding sulfonamide with phosphorus pentachloride as disclosed by A. V. Kirsanov in the Journal of General Chemistry at volume 22, page 329, page 373 (1952).

The aziridinyl compounds used in the reaction are the nitrogen analogs of alkylene oxides, and may be formed in the same general fashion, that is, by ring closure, involving the elimination of small groups suitably located in a chain.

Particularly desirable products from the standpoint of their utility in textile treating compositions have been obtained where the $R_1$ substituent of the phosphazo sulfone compound is benzene, or para toluene, or methyl or 3-nitro-4-aniline benzene, and the R substituents of the aziridinyl compound are hydrogen and methyl as e.g. in 2-methyl aziridine.

The phosphazo sulfone compound and the aziridinyl compound are reacted in an aqueous solvent or inert organic solvent or mixed aqueous-inert organic solvent and in the molar ratios of 3-moles of aziridinyl compound to 1 mole of phosphazo sulfone compound.

It is essential in carrying out the condensation that sufficient alkali be present to bind acid formed in the condensation. This is because the three membered ring of the aziridinyl compound is very easily opened in the presence of acidic reagents. Sufficient acid binder is present when at least mole for mole of acid binder is used in respect to aziridinyl compound used.

The following examples are intended to illustrate the new chemical compounds and the method of preparing them.

Example 1

Trichlorophosphazobenzene sulfone is reacted with 2-methyl aziridine in water using sodium hydroxide as binder.

In the reaction, an aqueous solution of 40.82 grams (1 mole) of 98% NaOH in 330 cc. of $H_2O$ is cooled to about −10° C., and to this solution is added 57.0 grams (1 mole) of 2-methylaziridine. To the resulting solution, 97.5 grams (⅓ mole) of trichloro-phosphazobenzenesulfone in 100 cc. of reagent acetone is added; dropwise through a funnel at about −5° C. and over a period of about ½ hour. The reaction is alkaline to brilliant yellow paper. The reaction is allowed to stir to room temperature and then extracted with $CHCl_3$. The $CHCl_3$ is then stripped and a yield of 98.6 grams of pale yellow liquid obtained (83.9% of theory) and corresponding to the formula—

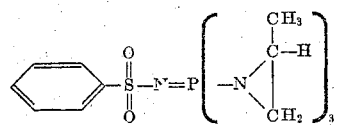

Example 2

Trichlorophosphazobenzene sulfone is reacted with 2-methylaziridine in reagent grade ethyl acetate using triethylamine as binder.

In the reaction, 106 grams (1 mole) of triethylamine is dissolved in 1 liter of ethyl acetate, the solution cooled to about −10° C., and 57 grams (1.0 mole) of 2-methylaziridine added thereto. Then, 97.5 grams (.33 mole) of the trichlorophosphazobenzenesulfone in 200 cc. of benzene is added drop-wise through a funnel and over a period of about ½ hour while maintaining the temperature at about −10° C. The reaction is stirred to room temperature, additional ethyl acetate added, and the reaction then stirred overnight. The next day, the triethylamine HCl salt is filtered off, the solvent stripped and the pale yellow liquid obtained placed in a vacuum dessicator to remove solvent left. After 7 days under vacuum, the yield of pale yellow liquid is 116.6 grams or 98.8% of theory.

A molecular weight determination (in benzene) and an analysis for nitrogen, sulfur, and phosphorous is then made on the product with the following result.

|  | (Mol. Wt.) | N, percent | S, percent | P, percent |
|---|---|---|---|---|
| Theory | 354 | 15.82 | 9.04 | 8.76 |
| Reported | 363–364 | 14.65 | 8.76 | 8.79 |

Example 3

Trichlorophosphazo-para-toluene sulfone is reacted with 2-methylaziridine in water using sodium hydroxide as a binder.

In the reaction, an aqueous solution of 61.23 grams (1.5 moles) of 98% NaOH in 660 cc. of distilled water is cooled to about −10° C. and 85.5 grams (1.5 moles) of 2-methylaziridine added thereto. Then, 153.25 grams (0.5 mole) of trichlorophosphazopara-toluene sulfone in crystal form is added over a period of about 25 minutes at about −5° C. The mixture is then stirred 1 hour at −5° C. and then allowed to come to room temperature. The mixture is stirred one more hour and the resulting product extracted with chloroform. The chloroform is stripped and a yield of 141.0 grams of pale yellow liquid obtained (76.6% of theory). The desired product corresponds to the formula:

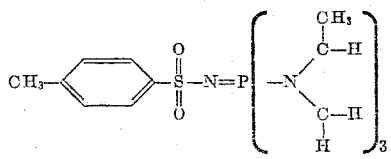

*Example 4*

Trichlorophosphazo paratoluene sulfone is reacted with 2-methylaziridine in ethyl acetate using triethylamine as the acid binder.

A reaction mixture of 166.65 grams (1.64 mole) of triethylamine in 1.5 liters of ethyl acetate is cooled to about 10° C. and 85.5 grams (1.5 mole) of 2-methylaziridine added thereto. To the above reaction mixture is added 153.25 grams (0.5 mole) of trichlorophosphazoparatoluene sulfone dissolved in 150 cc. acetone and 500 cc. benzene. This addition is made dropwise over a period of about an hour and a half at a temperature of about −15° C. At the end of the reaction, the reaction mixture tests slightly alkaline to phenolphthalein. The reaction is then allowed to come to room temperature and stirred overnight. The triethylaminehydrochloride salt is then filtered off, the solvent stripped, and the desired liquid product put in a vacuum dessicator overnight.

A molecular weight determination (in benzene) and an analysis for nitrogen, sulfur, and phosphorus is then made on the product with the following result.

|  | (Mol. Wt.) | N, percent | S, percent | P, percent |
|---|---|---|---|---|
| Theory | 368 | 15.22 | 9.04 | 8.76 |
| Reported | 355-380 | 14.51 | 8.76 | 8.79 |

*Example 5*

Trichlorophosphazo methyl sulfone is reacted with 2-methyl aziridine in anhydrous ether using triethylamine as the acid binder.

63.63 grams (0.63 mole) of triethylamine is charged into 400 cc. of anhydrous ethyl ether and the temperature cooled to 0° C. with a methyl ethyl ketone-carbon dioxide bath. Then 34.2 grams (0.6 mole) of 2-methyl aziridine is added. A charge of 46.1 grams (0.2 mole) of trichlorophosphazomethylsulfone in 100 cc. acetone is then added over a period of about a half hour keeping the temperature at −20 to −25° C. At the end of the reaction, 100 cc. more of ether is added and the reaction allowed to come to room temperature. The reaction tests slightly alkaline to phenolphthalein. The reaction is then stirred overnight, filtered to remove the triethylamine hydrochloride salt and washed with ether. The solvent is stripped under vacuum and a viscous liquid product corresponding to the formula:

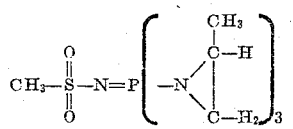

is obtained.

An analysis for nitrogen, sulfur, and phosphorus on the desired product gives the following results.

|  | N, percent | S, percent | P, percent |
|---|---|---|---|
| Theory | 19.18 | 10.96 | 10.62 |
| Reported | 18.9 | 10.28 | 10.4 |

*Example 6*

Trichlorophosphazomethylsulfone is condensed with 2-methyl aziridine in distilled water using sodium hydroxide as the acid binder.

60.612 grams (0.75 moles) of 98% sodium hydroxide is dissolved in 270 cc. of distilled water and the solution cooled to 0° C. with a methyl ethyl ketone-carbon dioxide bath. 42.75 grams (0.75 moles) of 2-methyl aziridine is added thereto. Then, a solution of 57.625 grams (0.25 moles) of trichlorophosphazomethyl sulfone in 100 cc. of acetone is added over a period of about 20 minutes while keeping the temperature at −5° C. At the end of the reaction, the reaction was allowed to come to room temperature, and the desired product extracted with chloroform. The chloroform is then stripped and a viscous liquid product corresponding to the formula:

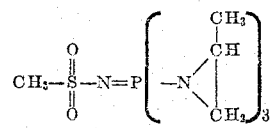

is obtained.

*Example 7*

Trichlorophosphazo (3-nitro-4-anilinobenzene) sulfone is reacted with 2-methyl aziridine in water using sodium hydroxide as the acid binder.

6.0 grams (0.15 moles) of sodium hydroxide is dissolved in 50 cc. of water and the solution cooled to 0° C. 8.6 grams (0.15 moles) of 2-methyl aziridine is added. Then, a solution of 21.5 grams (0.05 moles) of trichlorophosphazo (3-nitro-4-anilino benzene) sulfone in 70 cc. of methylene chloride is added dropwise; the addition taking about 1 hour and being run at −5° C. The reaction is stirred 2 hours longer and allowed to come to room temperature during that time. The product is then extracted with methylene chloride and ethyl ether, the solvents stripped in vacuo, and the material brought to a more crystalline form by washing in a small amount of ether. The viscous liquid product obtained corresponds to the formula:

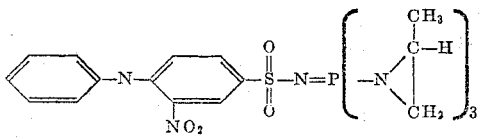

A nitrogen, carbon, and the hydrogen analysis of the product gives the following result:

|  | Percent N | Percent C | Percent H |
|---|---|---|---|
| Theory | 17.1 | 51.32 | 5.5 |
| Reported | 17.22 | 49.46 | 5.42 |

The new condensation products of the invention as illustrated in the foregoing examples have been found to be useful as cross-linking agents when incorporated into textile treating compositions. That is, non-woven fabrics having good scrub resistance can be obtained by using as a binder a latex of a polymer containing carboxyl groups and the new condensation products of the invention as cross-linking agents for the polymer.

In addition to the crosslinking function, the new chemical compounds also offer interesting possibilities as colorants in printing compositions where $R_1$ in the general formula for the compounds is a dye molecule as e.g. the 3-nitro-4-anilino benzene of Example 7.

It is intended that the foregoing disclosure be considered illustrative only and not in limitation of the invention as hereinafter defined.

What is claimed is:
1. New chemical compounds of the group having the formula:

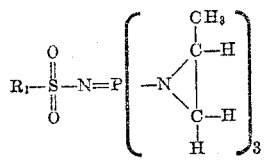

where $R_1$ is taken from the group consisting of benzene, para toluene, methyl, and 3-nitro-4-anilino benzene.

2.

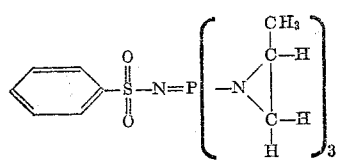

3.

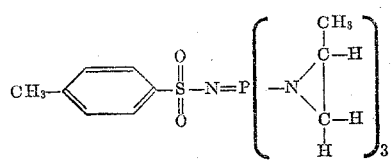

4.

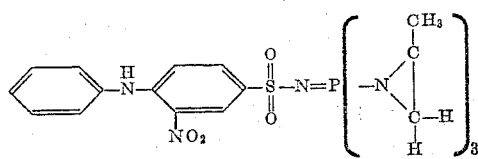

5.

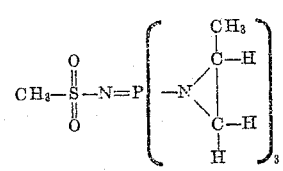

6. The method of preparing new chemical compounds of the formula:

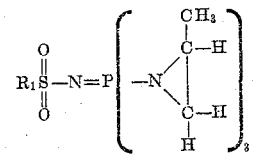

where $R_1$ is taken from the group consisting of benzene, para toluene, methyl, and 3-nitro-4-anilino benzene comprising reacting one molar amount of a compound of formula:

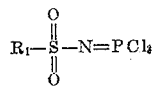

where $R_1$ is taken from group consisting of benzene, para toluene, methyl, and 3-nitro-4-anilino benzene with three molar amounts of a compound of formula:

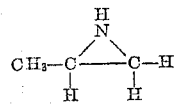

in a solvent medium containing a sufficient amount of a suitable acid binder to bind the acid formed in the reaction.

References Cited in the file of this patent

Chemical Abstracts, vol. 50, p. 14631 (1956).
Chemical Abstracts, vol. 51, p. 8675f (1957).